US011306927B2

(12) United States Patent
Dempster et al.

(10) Patent No.: US 11,306,927 B2
(45) Date of Patent: Apr. 19, 2022

(54) SYSTEMS AND METHODS FOR FAULT DETECTION USING SMART VALVES

(71) Applicant: BELIMO HOLDING AG, Hinwil (CH)

(72) Inventors: Ian Robert Dempster, Seattle, WA (US); Benjamin Paul Erpelding, San Diego, CA (US); Thomas Bennett Hartman, Georgetown, TX (US); Chelsey Ann MacNeill, Barton City, MI (US)

(73) Assignee: BELIMO HOLDING AG, Hinwil (CH)

( * ) Notice: Subject to any disclaimer, the term of this patent is extended or adjusted under 35 U.S.C. 154(b) by 246 days.

(21) Appl. No.: 16/601,768

(22) Filed: Oct. 15, 2019

(65) Prior Publication Data

US 2020/0063990 A1    Feb. 27, 2020

Related U.S. Application Data

(60) Division of application No. 14/699,485, filed on Apr. 29, 2015, now Pat. No. 10,465,925, which is a
(Continued)

(51) Int. Cl.
*F24F 3/08* (2006.01)
*G01K 13/02* (2021.01)
(Continued)

(52) U.S. Cl.
CPC ............. *F24F 3/08* (2013.01); *F24D 19/1006* (2013.01); *F24F 3/044* (2013.01); *F24F 11/30* (2018.01);
(Continued)

(58) Field of Classification Search
CPC ........ F24F 2110/10; F24F 11/83; F24F 11/62; F24F 11/30; F24F 3/08; F24F 11/56;
(Continued)

(56) References Cited

U.S. PATENT DOCUMENTS 4,199,101 A * 4/1980 Bramow ................. F24F 11/30
236/13
5,564,626 A * 10/1996 Kettler ..................... F24F 8/10
236/49.3
(Continued)

*Primary Examiner* — Ljiljana V. Ciric
(74) *Attorney, Agent, or Firm* — Sughrue Mion, PLLC

(57) ABSTRACT

A fault detection system for detecting a flow restriction in an air handler is provided. The system includes a coil, air and liquid temperature sensors, a smart valve and a notification device. The coil is located in an air stream of the air handler. The air temperature sensors are located in the air stream, one sensor determining an air temperature of air upstream of the coil and another determines an air temperature downstream of the coil. The liquid temperature sensors determine a liquid temperature entering the coil and exiting the coil. The smart valve includes a controller in communication with the liquid temperature sensors and at least one of the air temperature sensors that uses the measured air temperature downstream of the coil and a valve actuator position to determine whether the coil is operating at a reduced capacity. The notification device communicates with the controller of the smart valve.

8 Claims, 8 Drawing Sheets

Related U.S. Application Data continuation-in-part of application No. 14/108,725, filed on Dec. 17, 2013, now Pat. No. 10,119,711.

(51) Int. Cl.

| | | |
|---|---|---|
| *F24D 19/10* | (2006.01) | |
| *F24F 11/30* | (2018.01) | |
| *F24F 11/62* | (2018.01) | |
| *F24F 11/83* | (2018.01) | |
| *F24H 3/08* | (2006.01) | |
| *F24F 3/044* | (2006.01) | |
| *F24H 9/20* | (2006.01) | |
| *F24F 11/56* | (2018.01) | |
| *F24F 140/20* | (2018.01) | |
| *F24F 110/10* | (2018.01) | |
| *F24F 11/32* | (2018.01) | |
| *F24F 11/84* | (2018.01) | |
| *G01K 13/024* | (2021.01) | |

(52) U.S. Cl.
CPC .............. *F24F 11/62* (2018.01); *F24F 11/83* (2018.01); *F24H 3/08* (2013.01); *F24H 9/2064* (2013.01); *G01K 13/02* (2013.01); *F24F 11/32* (2018.01); *F24F 11/56* (2018.01); *F24F 11/84* (2018.01); *F24F 2110/10* (2018.01); *F24F 2140/20* (2018.01); *G01K 13/024* (2021.01); *G01K 13/026* (2021.01)

(58) Field of Classification Search
CPC ...... F24F 2140/20; F24F 11/32; G01K 13/02; G01K 2013/024; G01K 2013/026; F24D 19/1006
See application file for complete search history.

(56) References Cited

U.S. PATENT DOCUMENTS

| | | | | |
|---|---|---|---|---|
| 6,519,938 | B1* | 2/2003 | Foss | B25F 5/00 |
| | | | | 60/368 |
| 8,044,793 | B2* | 10/2011 | Eryurek | G05B 23/027 |
| | | | | 340/517 |
| 8,840,118 | B1 | 9/2014 | Giovanardi et al. | |
| 9,168,315 | B1* | 10/2015 | Scaringe | F25B 49/02 |
| 9,550,404 | B2 | 1/2017 | Giovanardi et al. | |
| 9,657,946 | B2* | 5/2017 | Young | F23N 1/022 |
| 9,676,244 | B2 | 6/2017 | Giovanardi et al. | |
| 9,890,970 | B2* | 2/2018 | Bruck | F24F 11/30 |
| 10,029,534 | B2 | 7/2018 | Giovanardi et al. | |
| 10,222,767 | B2* | 3/2019 | Holaso | F24F 11/30 |
| 10,309,662 | B2* | 6/2019 | Alston | F24F 13/0218 |
| 2005/0115258 | A1* | 6/2005 | Violand | F24F 11/77 |
| | | | | 62/186 |
| 2006/0105760 | A1* | 5/2006 | Shamoon | H04M 1/72415 |
| | | | | 455/423 |
| 2006/0272710 | A1* | 12/2006 | Minervini | F16K 37/0033 |
| | | | | 137/487.5 |
| 2007/0181701 | A1* | 8/2007 | Cheng | F24F 11/83 |
| | | | | 236/49.3 |
| 2008/0223943 | A1* | 9/2008 | Mulhouse | F24F 11/30 |
| | | | | 236/49.3 |
| 2010/0070086 | A1* | 3/2010 | Harrod | F24F 11/30 |
| | | | | 700/276 |
| 2010/0082161 | A1* | 4/2010 | Patch | F24F 11/30 |
| | | | | 700/276 |
| 2012/0221150 | A1* | 8/2012 | Arensmeier | G05B 23/0221 |
| | | | | 700/276 |
| 2013/0263034 | A1* | 10/2013 | Bruck | G06F 3/04842 |
| | | | | 715/771 |
| 2014/0120447 | A1* | 5/2014 | Mussro | F04B 51/00 |
| | | | | 429/444 |
| 2014/0246024 | A1* | 9/2014 | Cragg | A61M 16/0683 |
| | | | | 128/204.19 |
| 2014/0246025 | A1* | 9/2014 | Cragg | A61M 16/208 |
| | | | | 128/204.19 |
| 2014/0260233 | A1* | 9/2014 | Giovanardi | F16K 11/065 |
| | | | | 60/431 |
| 2014/0262134 | A1* | 9/2014 | Arensmeier | F24D 5/12 |
| | | | | 165/11.2 |
| 2014/0265168 | A1 | 9/2014 | Giovanardi et al. | |
| 2014/0265169 | A1 | 9/2014 | Giovanardi et al. | |
| 2014/0265170 | A1 | 9/2014 | Giovanardi et al. | |
| 2014/0266755 | A1* | 9/2014 | Arensmeier | F24F 11/62 |
| | | | | 340/679 |
| 2014/0297113 | A1* | 10/2014 | Zuckerman | B60G 17/0152 |
| | | | | 701/36 |
| 2014/0372164 | A1 | 12/2014 | Egan et al. | |
| 2015/0045982 | A1 | 2/2015 | Egan et al. | |
| 2015/0168041 | A1* | 6/2015 | Havard, Jr | F25B 41/20 |
| | | | | 62/228.1 |
| 2015/0224845 | A1* | 8/2015 | Anderson | B60G 13/14 |
| | | | | 701/37 |
| 2015/0233597 | A1* | 8/2015 | Dempster | F24F 11/30 |
| | | | | 165/11.2 |
| 2015/0293505 | A1 | 10/2015 | Gonzalez | |
| 2015/0323211 | A1* | 11/2015 | Abiprojo | F24D 19/1084 |
| | | | | 236/1 C |
| 2015/0323215 | A1* | 11/2015 | Arensmeier | G01M 99/008 |
| | | | | 702/182 |
| 2015/0330650 | A1* | 11/2015 | Abiprojo | F24F 11/62 |
| | | | | 700/276 |
| 2015/0330861 | A1* | 11/2015 | Alsaleem | G01R 19/0092 |
| | | | | 702/183 |
| 2015/0345821 | A1* | 12/2015 | Alsaleem | F25B 49/005 |
| | | | | 374/147 |
| 2015/0361864 | A1* | 12/2015 | Wagner | F01P 7/08 |
| | | | | 165/300 |
| 2015/0362207 | A1* | 12/2015 | Abiprojo | F24F 11/30 |
| | | | | 702/183 |
| 2016/0061508 | A1* | 3/2016 | Lowrimore | F24H 9/20 |
| | | | | 62/160 |
| 2016/0098044 | A1* | 4/2016 | Junk | F16K 37/0083 |
| | | | | 700/282 |
| 2016/0166745 | A1 | 6/2016 | Aalders | |
| 2016/0377309 | A1* | 12/2016 | Abiprojo | G06Q 10/06 |
| | | | | 700/276 |
| 2017/0051477 | A1* | 2/2017 | Sawyer | F24F 3/06 |
| 2017/0076263 | A1* | 3/2017 | Bentz | G06Q 20/102 |
| 2017/0089598 | A1* | 3/2017 | Wallace | G05B 23/0218 |
| 2017/0124842 | A1* | 5/2017 | Sinha | G07F 9/0235 |
| 2017/0198930 | A1* | 7/2017 | Secor | G05B 19/048 |
| 2017/0234562 | A1* | 8/2017 | Ribbich | G05D 23/1923 |
| | | | | 700/277 |
| 2017/0292725 | A1* | 10/2017 | Conley | G05B 19/048 |
| 2018/0109906 | A1* | 4/2018 | Sentz | H04W 4/38 |
| 2018/0112886 | A1* | 4/2018 | Boody | F24F 11/81 |
| 2018/0245102 | A1* | 8/2018 | Lloyd | C01B 17/74 |
| 2018/0297432 | A1 | 10/2018 | Giovanardi et al. | |
| 2018/0312260 | A1* | 11/2018 | Grant | B64D 13/06 |
| 2018/0365964 | A1* | 12/2018 | Carson | G01L 5/0052 |
| 2019/0078823 | A1* | 3/2019 | Havard, Jr | F25B 49/02 |

\* cited by examiner

SYSTEMS AND METHODS FOR FAULT DETECTION USING SMART VALVES

PRIORITY

This application is a Divisional of U.S. patent application Ser. No. 14/699,485 filed Apr. 29, 2015, which is continuation-in-part of and claims the benefit of priority from U.S. patent application Ser. No. 14/108,725 filed on Dec. 17, 2013, now U.S. Pat. No. 10,119,711, issued Nov. 6, 2018. The entire contents of each of which are herein incorporated by reference in their entireties.

FIELD OF THE INVENTION

The present invention generally relates to systems and methods for selectively employing smart valves to detect, diagnose, and communicate complex hardware, programming and/or mechanical faults in an air handler unit (AHU) through an automation system or through direct communication of one or more smart valves within the AHU to one or more remote devices intended for the purpose.

BACKGROUND

Air handler units (AHUs) are commonly employed to condition and circulate air as part of a heating, ventilating, and air-conditioning (HVAC) system for buildings, and large buildings in particular. AHUs may provide heating, cooling, or both to change the supply air temperature, humidity level, or both depending an geographic location and current environmental factors. Such conditioning is provided by coil(s) (e.g., heat exchanger coils or cooling coils) located to interact with the AHU's air flow. AHUs may take the form of terminal units (also called fan coil units), packaged units or rooftop units, but will be referred to herein as AHUs for purpose of brevity.

Conditioning of the air flow typically employs the use of hot water or steam for heating and cool or chilled water, and sometimes refrigerant for cooling. Coils for transferring heat may take the form of metallic tubes combined with metallic fins to encourage heat transfer; whereas cooling coils may also employ eliminator plates and condensate pans to remove and drain condensation. In many applications, air flow control dampers (often called "economizer" dampers) also regulate the flow of outside air into the AHU to provide cooling requirements in place of the cooling coil when the outside air temperatures are sufficiently low. In large buildings or building complexes central boiler and chiller plants are generally employed to generate hot water/steam and cool water, respectively. The water is circulated to and through the building in dedicated conduit and valves controlled by the building automation system modulate the flow of the water or other fluid through the coils inside the AHUs.

In more modern HVAC systems, the AHUs may include smart (also referred to as self-ranging, self-balancing or self-regulating) valves that modulate the flow of the water through the coils inside the AHUs. These conventional smart valves typically communicate with water temperature sensors that monitor the temperature of the cold/hot water return and/or supply flows, and may also communicate with one or more air temperature sensors that monitor the temperature of the air flowing through the coil under its control.

When the water temperature sensors monitor both the return and supply flows, the smart valve may be configured to maintain a minimum temperature difference between the supply and return flows in addition to controlling the temperature of the air being discharged from the coil. In addition, the AHUs include fans or blowers that move the air flow over and/or through the coils to obtain a desired downstream (sometimes called "off coil", "discharge" or "supply) air temperature and a desired airflow volume. The downstream air flow may be directed toward a desired space (e.g., a room or hallway) through air ducts and/or vents.

The control of the AHU, generally, and the control of at least some of the equipment comprising the AHU may be accomplished with an automation system such as, but not limited to a unit or building automation system (hereinafter generally referred to as a building automation system or BAS). Controlling the downstream air temperature, in particular, may be based an comfort requirements or desires, equipment capabilities, process requirements, efficiency goals, or some combination thereof.

Building automation systems typically have the capacity to provide alarms to a remote Operator station or data server. However, this alarming capacity is limited. Generally, alarms can be set to annunciate when temperatures are out of expected range or when equipment fails to start or stop properly. These alarm functions typically have some interlock and time delay features so, for example, an out or range temperature value will annunciate only when the fan in the AHU is running and has been running for a predetermined period of time. However, alarm features currently available are very limited in their flexibility to detect faults, and have no diagnostic nor fault mitigation capabilities.

BRIEF SUMMARY OF THE INVENTION

The present invention is generally directed toward systems and methods for employing smart valves of an air handler unit (AHU) in communication with a building automation system (BAS) or through direct communication of one or more other smart valves within the AHU to recognize, report, and adjust smart valve operations to mitigate faults that may develop in the mechanics or controls of the AHU. In one embodiment, the smart valve notifies operations staff and automatically reacts to an impending coil freeze condition. In another embodiment, one or more smart valves in communication in an AHU recognize and notify operations of insufficient heating or cooling being delivered by the AHU and automatically readjust controls within preset limitations to increase the heating or cooling potential of the AHU to increase the heating or cooling output from the AHU. Another embodiment incorporates the logic capacity of the smart valves an heating and cooling coils within an AHU to prevent simultaneous or near-simultaneous heating and cooling. The smart valves can also be incorporated to alert operations staff when outside air regulation via the economizer dampers is not operating properly.

In one aspect of the prevent invention, a fault detection system for detecting a lack of air flow in an air handler unit includes a coil located in an air stream of the air handler unit, the coil configured to operate as a conduit for process fluid in the system; air temperature sensors located in an air stream of the air handler unit, one temperature sensor located to determine an air temperature of air upstream of the coil and another temperature sensor located to determine an air temperature downstream of the coil; liquid temperature sensors located to determine a liquid temperature entering the coil and to determine a liquid temperature exiting the coil; a smart valve having a controller in communication with the liquid temperature sensors and at least one of the air temperature sensors, the controller operable to utilize the measured temperatures for a period of time to determine whether the air handler unit is experiencing a lack of air flow; and a notification device in communication with the controller of the smart valve, wherein determining the lack of air flow, the smart valve activates the notification device and the controller of the smart valve mitigates an energy loss by changing a valve position of a smart valve actuator to fully closed or partially closed.

In another aspect of the invention, a fault detection system for detecting a flow restriction in an air handler unit, the fault detection system includes a coil located in an air stream of the air handler unit, the coil configured to operate as a conduit for process fluid in the system, the coil having a plurality of design parameters; air temperature sensors located in an air stream of the air handler unit, one temperature sensor located to determine an air temperature of air upstream of the coil and another temperature sensor located to determine an air temperature downstream of the coil; liquid temperature sensors located to determine a liquid temperature entering the coil and to determine a liquid temperature exiting the coil; a smart valve having a controller in communication with the liquid temperature sensors and at least one of the air temperature sensors, the controller operable to use the measured air temperature downstream of the coil and a valve actuator position to determine whether the coil is operating at a reduced capacity; and a notification device in communication with the controller of the smart valve.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
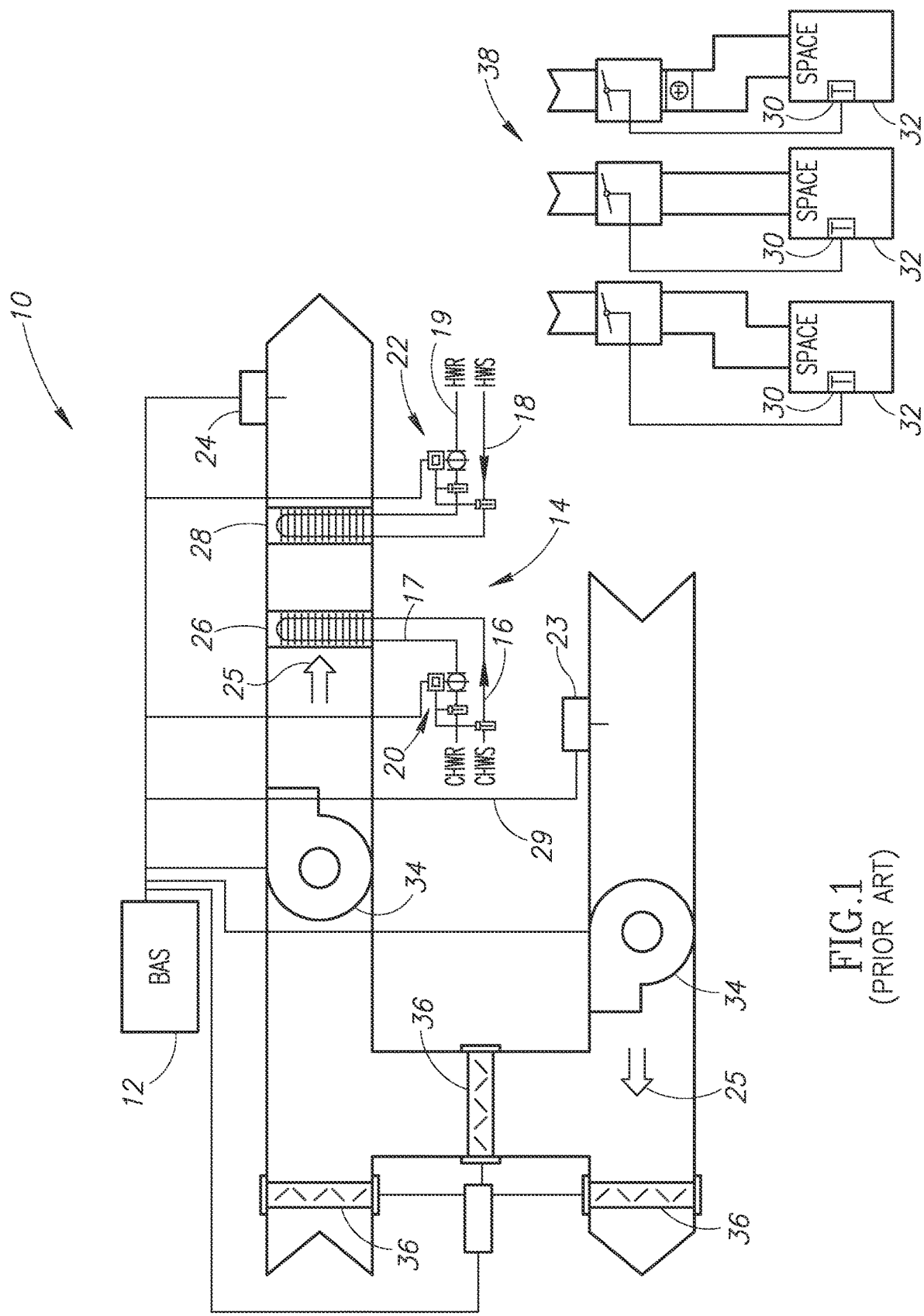
FIG. 1 is a schematic system diagram of a prior-art air handling unit.

In the following description, certain specific details are set forth in order to provide a thorough understanding of various embodiments of the invention. However, one skilled in the art will understand that the invention may be practiced without these details. In other instances, well-known structures associated with HVAC systems; automation systems (e.g., building automation systems referred to as BASs); air handler units (AHUs) such as, but not limited to terminal units (also called fan coil units), packaged units or rooftop units, and various equipment used in AHUs such as, but not limited to, controllable valves, heating and cooling coils, various types of sensors; controllers and processors; communication networks; various computing and/or processing systems; various HVAC and/or AHU system operational parameters and set points; and methods of operating any of the above with respect to one or more buildings have not necessarily been shown or described in detail to avoid unnecessarily obscuring descriptions of the embodiments of the invention.

In one embodiment, the present invention is direct to modulating control valves of an AHU in which the valves meter the amount of water that flows through a coil in an AHU. There are certain operating and environmental conditions that occur and others caused by mechanical failures that may lead to excessive energy use, poor control or physical damage. Accordingly, one or more smart valve may be configured to assist in diagnosing those conditions and/or faults and possibly function to mitigate or at least partially mitigate the less than desirable efficiency conditions.

In the following description, certain specific details are set forth in order to provide a thorough understanding of various embodiments of the invention. However, one skilled in the art will understand that the invention may be practiced without these details. In other instances, well-known structures associated with HVAC systems; automation systems (e.g., building automation systems referred to as BASs); air handler units (AHUs) such as, but not limited to terminal units (also called fan coil units), packaged units or rooftop units, and various equipment used in AHUs such as, but not limited to, controllable valves, heating and cooling coils, various types of sensors; controllers and processors; communication networks; various computing and/or processing systems; various HVAC and/or AHU system operational parameters and set points; and methods of operating any of the above with respect to one or more buildings have not necessarily been shown or described in detail to avoid unnecessarily obscuring descriptions of the embodiments of the invention.

Self-regulating or smart valves are typically employed to maintain a specific, but often adjustable, air temperature for air being moved past the coil served by the smart valve. In many applications, the AHUs, and in particular the coils, may be unable to meet an air temperature set point, may be susceptible to time of unstable control, may provide insufficient heating or cooling or at an insufficient rate, may be susceptible to potential freezing conditions, simultaneous heating and cooling (i.e., fighting). In addition dampers that mix outside and return air may malfunction. Any one of the foregoing or some combination thereof may result in undesired energy inefficiencies, loss of needed heating or cooling capacity, unstable operation, or some combination of these or other failures.

In conventional AHU and HVAC systems, such as the prior-art AHU system 10 shown in FIG. 1, a BAS controller 12, which may be located internally within or externally from the AHU, communicates with the AHU system 10, and in particular may communicate directly or indirectly with various components of the AHU system 10. The AHU system 10 typically includes two water loops 16, 18 that receive heated or cooled water, respectively, (or sometimes heated and cooled simultaneously for humidity control purposes) from a coldwater supply line 16 and a hot water supply line 18, respectively. The flow of the chilled water through the cooling coil 26 and back to the chilled water return line 17 is controlled (e.g., modulated) by a smart valve 20. Similarly, the flow of heating water through the heating coil 28 and back to the hot water return line 19 is controlled by a smart valve 22. Each smart valve 20, 22 may communicate bi-directionally with and provide information to and from the BAS controller 12. One or more air temperature sensors 23, 24 may be positioned within the AHU system 10 in which air direction is indicated by arrows 25. The air temperature sensors 23, 24 are in direct electronic communication with the BAS 12 as indicated by communication lines 27, 29, respectively. The BAS 12 then controls or modulates the smart valves 20, 22. This control or modulation is accomplished with PI or PID control techniques (P=proportional, I=integral, and D=derivative). With a PI or PID control technique, a comparison is made between a current air temperature and a desired temperature, in which the latter is also referred to as a "setpoint". The comparison is used to develop an error signal. A value of the error signal is determined by a calculation that includes summing the proportional, integral, and derivative gains (each gain is individually adjustable and can be set to zero in which case that element is not part of the error signal). Conventionally, the combination of the PI or PID gain calculations/summations and the air temperature sensors in direct electronic communication with the BAS 12 are the only input needed to develop the error signal. Because the characteristics of each valve 20, 22 and coil 26, 28 are different, the PI or PID gains must be programmed individually for each valve 20, 22. Achieving good control and stable Operation takes a certain degree of expertise and experience and considerable time for set up and tuning. By way of example, tuning the BAS 12 to control the valves 20, 22 for one range of conditions does not ensure the valves 20, 22 will operate with sufficient stability and accuracy under all conditions because the PI or PID calculations require a continuously proportional relationship between the coil capacity and valve actuation. Certain design rules of thumb are employed to achieve this proportional relationship, but it cannot ever be completely achieved, and the demands of operational flexibility and energy efficiency make it unlikely to be even marginally achieved in conventional AHUs. Consequently, a BAS 12 that is tuned to operate the valves 20, 22 efficiently under a particular set of circumstances (e.g., a specific season), will most likely operate unsatisfactorily under other circumstances or during different seasons.

Still referring to FIG. 1, the upper air temperature sensor 24 is located in the AHU system 10 downstream of the cooling coil 26 and the heating coil 28, respectively. Another air temperature sensor 30 may be located in a space 32 that receives conditioned air from the AHU system 10. The air temperature sensor 30 is also in direct electronic communication with the BAS 12 as indicated by signal 31. The various air temperature sensors 23, 24, 30 are typically employed by the BAS 12 to evaluate the air temperature moving through the AHU system 10 and the air temperature in the space 32 in order to maintain a desired temperature condition in the space 32 and to determine a volume of airflow required through the AHU system 10. The sensors 23, 24, 30 may communicate directly or indirectly with the BAS controller 12.

One or more fans or blowers 34 are located in the AHU system 10 to move air through or within the AHU system 10 and specifically to move air past the coils 26, 28. The AHU system 10 may further include air mixing dampers 36 to regulate the mixing of outside air and return air into the AHU system 10 for ventilation purposes or to use outside air for cooling when conditions permit. Temperature controlled variable-air-volume (VAV) boxes 38 may be connected to the AHU system 10 and employed to regulate the flow of air from the AHU system 10 into one or more individual spaces 32 served by the AHU system 10. One or more fans or blowers are located in the AHU system to move air through or within the AHU system and specifically to move air past the coils 26, 28. The AHU system may further include air mixing dampers 36 to regulate the mixing of outside air and return air into the AHU system for ventilation purposes or to use outside air for cooling when conditions permit. Temperature controlled variable-air-volume (VAV) boxes 38 may be connected to the AHU system and employed to regulate the flow of air from the AHU system into one or more individual spaces 32 served by the AHU system.

Smart valves, such as the ones described in U.S. Pat. No. 6,607,140 entitled "Method for Precise Electric Actuator Control with Reduced Repositioning" and in U.S. Pat. No. 6,352,106 entitled "High-Efficiency Pumping and Distribution System Incorporating a Self-Balancing, Modulating Control Valve" may be capable of maintaining or controlling the heating and/or cooling of water in an AHU system with control logic and commands supplied by the BAS. The BAS may utilize a differential water temperature, a measured flow rate and/or other system parameters to determine respective valve positions (e.g., the valve actuators) for the smart valves. Smart valves, such as the ones described in U.S. Pat. No. 6,607,140 entitled "Method for Precise Electric Actuator Control with Reduced Repositioning," U.S. Pat. No. 6,352,106 entitled "High-Efficiency Pumping and Distribution System Incorporating a Self-Balancing, Modulating Control Valve," and U.S. patent application Ser. No. 14/108, 725 entitled "Systems and Methods for Using a Smart Valve to Control Conditioned Air," may be capable of maintaining or controlling the heating and/or cooling of water in an AHU system with control logic and commands supplied by the BAS or internally. The aforementioned references are incorporated herein by reference in their entireties.

Figure 2:
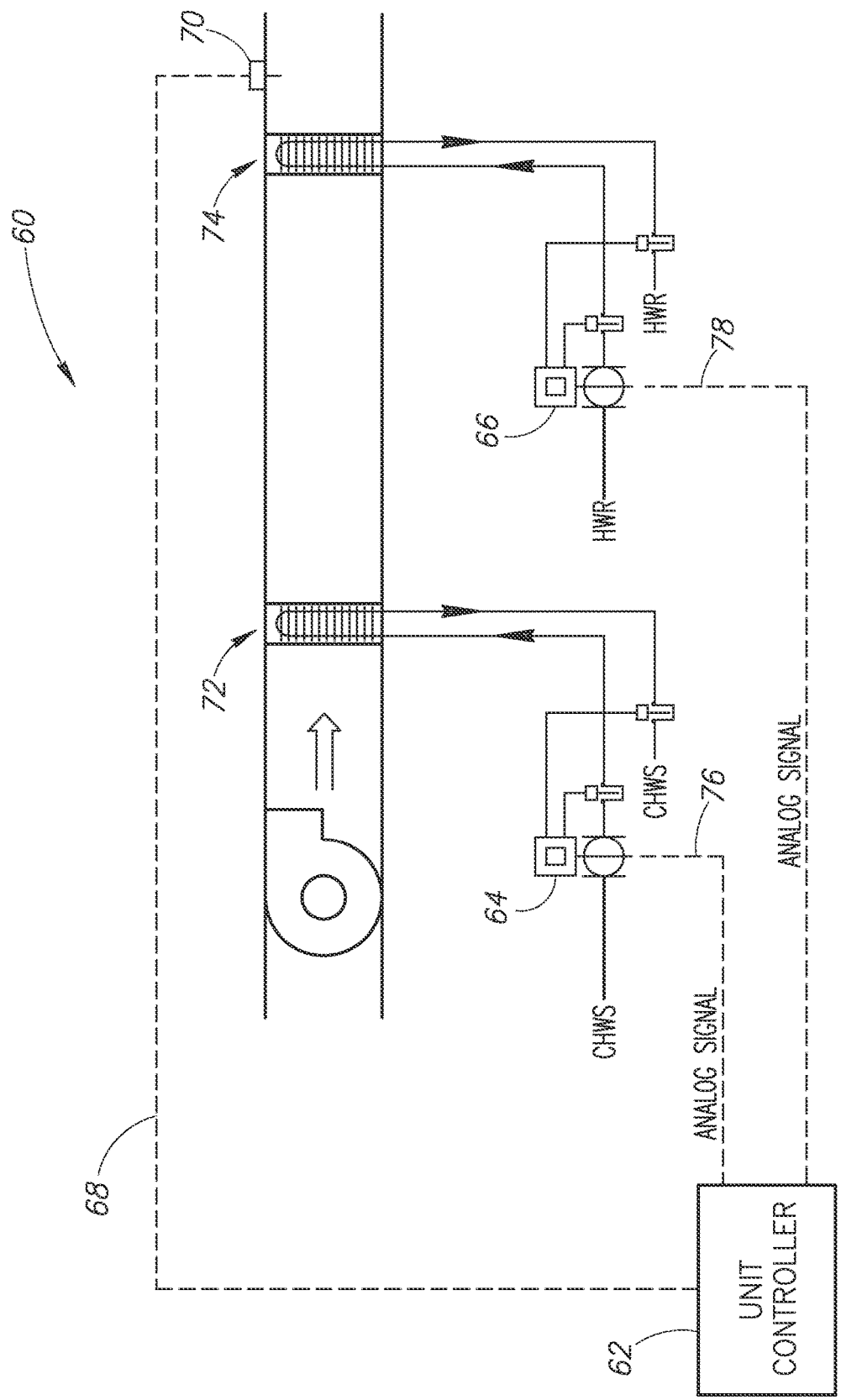
FIG. 2 is schematic system diagram of a fan coil unit.

FIG. 2 shows a fan coil unit 60 having a unit controller 62 that directly controls the respective valve positions of smart valves 64, 66 with an input Signal 68 from an air temperature sensor 70 located downstream of the coils 72, 74. Typically, the valve positions are calibrated using analog position command signals 76 and 78 that may be decoded to a 0-100 percentage open (where 0%=fully closed and 100%=fully open) valve position of the valve actuator in response to an error between an actual supply air temperature and a required or desired supply air temperature. When the unit controller 62 is initially programmed, a required step in setting up the control logic is for a controls programmer to adjust a proportional-integral (PI) or a proportional-integral-derivative (PID) controller for the valves 64, 66 so fan coil unit 60 will maintain air temperature in a stable manner. Unfortunately, inexperienced or hurried programmers may, and often do, miss this required step. Alternatively or additionally, or a lack of linearity between the input and output of the valve control loops frequently results in a lack of stable control of the air temperature and variable, but inconsistent, control of an amount of energy loss by the fan coil unit 60. Ultimately, the rooms or spaces that are meant to receive conditioned air from the fan coil unit 60 may be either too cool, too hot or have temperature swings regardless of a temperature setting an a thermostat or a temperature sensor within the room or space.

In one embodiment of the present invention, an air temperature sensor is incorporated into a smart valve to provide a means of multivariable control, also referred to as relational control, for modulating the smart valve with greater precision, less setup, and virtually no tuning. Along with current and recent history of valve positioning, the smart valve directly receives temperature values of the water leaving and entering a heating and/or a cooling coil. With this information the smart valve may calculate how much valve movement is required to meet a change in capacity, and therefore temperature change, that may be needed to meet a current air temperature setpoint under a variety of operating circumstances or conditions. The multivariable control permits the valve modulations to be calculated with substantial precision an a real time basis.

The multivariable control may be accomplished by an automation system such as, but not limited to a BAS, that receives signals directly from the smart valves identifying a current valve position and a current water temperature. However, maintaining control within the BAS could produce latency or lag due to a time delay associated with acquiring these values from the smart valve, transmitting these values to the BAS, processing these values, and providing command instructions back to the smart valve. Configuring a general purpose BAS to perform such multivariable control is typically expensive to implement. Consequently, one or more embodiments of the present invention may advantageously provide a more cost efficient and effective means of reducing the cost of implementing valve control while also improving the accuracy and stability of that control.

Figure 3:
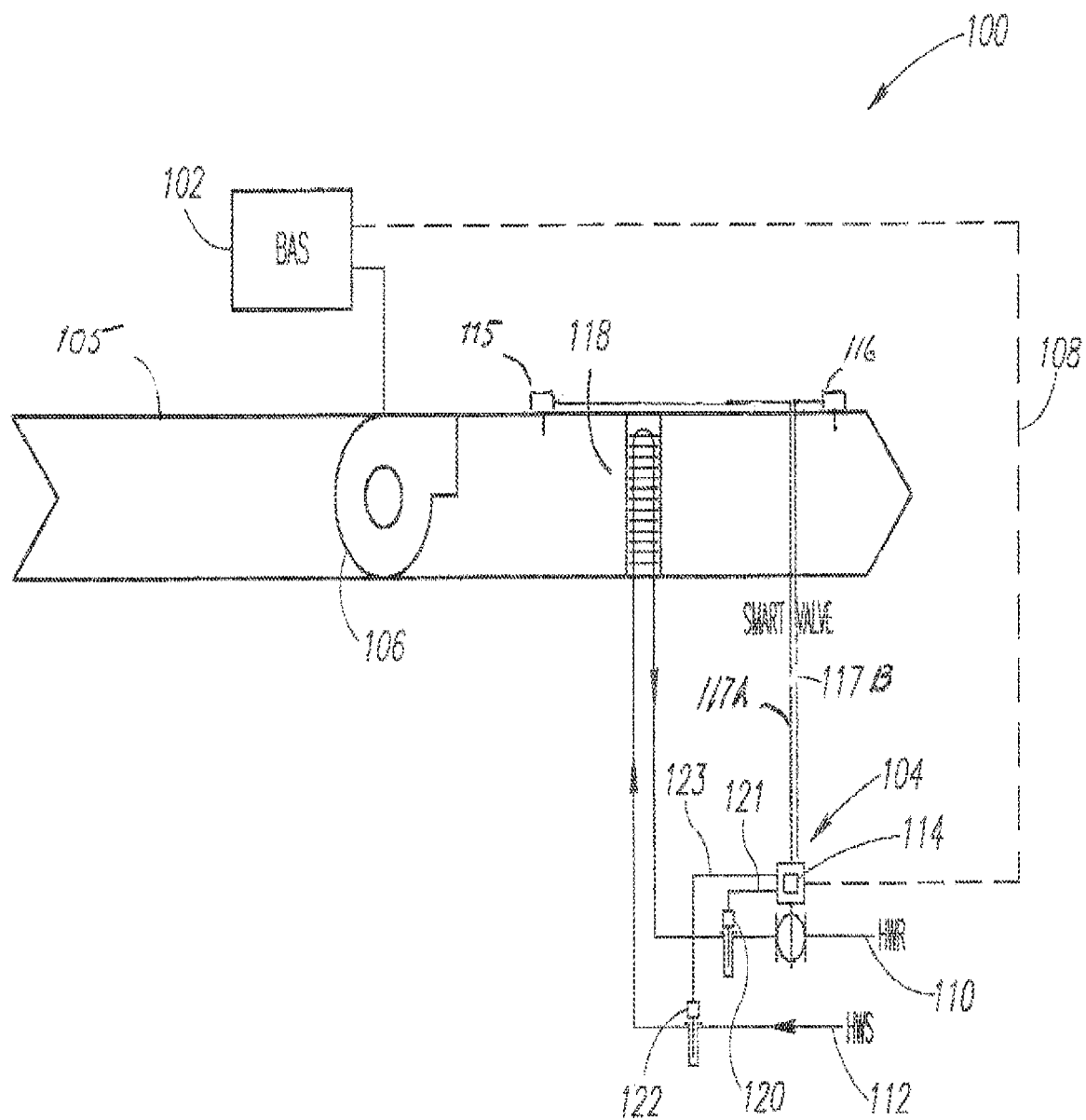
FIG. 3 is a schematic system diagram of an air handling unit (AHU) without a building automation system (BAS) directly controlling a smart valve and wherein the smart valve processes information from at least one air temperature sensor and at least one water temperature sensor according to an embodiment of the present invention.

FIG. 3 shows a single coil AHU system 100 having a BAS 102 that does not directly control a smart valve 104 according to an embodiment of the present invention. As discussed above, conventional AHU systems require a separate controller (e.g., the BAS or other unit controller) to modulate the valve position when maintaining a desired air stream temperature leaving the coil. In the illustrated embodiment, the single coil AHU system 100 includes a duct 105 having therein a fan or blower 106 in signal communication with the BAS 102, a water return line 110, and a water supply line 112. The Phrase "single coil" refers to a simple AHU system that incorporates only a heating or a cooling coil 118, but not both, within the duct 105. The smart valve 104 includes a processor 114 that receives information from an air temperature sensor 115 in the duct 105 upstream of the coil 118 and/or an air temperature sensor 116 in the air stream downstream of the coil 118. The smart valve 104 also receives information from a water return (WR) temperature sensor 120 and may also receive information from a water supply (WS) temperature sensor 122. The WR and WS temperature sensors 120, 122 operate to provide water temperature values to the smart valve 104, and in turn the smart valve 104 determines a temperature differential between the supply and return lines 110, 112. The processor 114 is programmable to receive the information, independent of the BAS 102, and determine a valve position (e.g., percentage (%) open) of the smart valve 104.

Controlling the valve position independent of the BAS 102 eliminates the need for the programmer to adjust or tune the control logic in the BAS 102 that would have otherwise controlled the valve position of the smart valve 104. Instead, the control logic in the processor 114 of smart valve 104 automatically tunes the smart valve 104 to modulate its position based an the temperature sensor 115, 116, 120, 122 values transmitted to the smart valve 104 through direct communication signals 117A, 117B, 121, and 123, respectively, using advanced multi-variable control techniques. These multivariable temperature inputs 117A, 117B, 121, 123 advantageously result in a more accurate, stable and reliable AHU supply air temperature control without requiring special programming within the BAS 102. In one embodiment of the AHU system 100, the BAS 102 may be in one-directional or bi-directional communication with the smart valve 104 as illustrated by the dashed line 108. Regardless of the communication between the BAS 102 and the smart valve 104, the smart valve 104 controls its own internal valve position, which in turn may advantageously eliminate or at least reduce modulation instabilities that may otherwise occur with direct BAS control of the smart valve 104.

Figure 4:
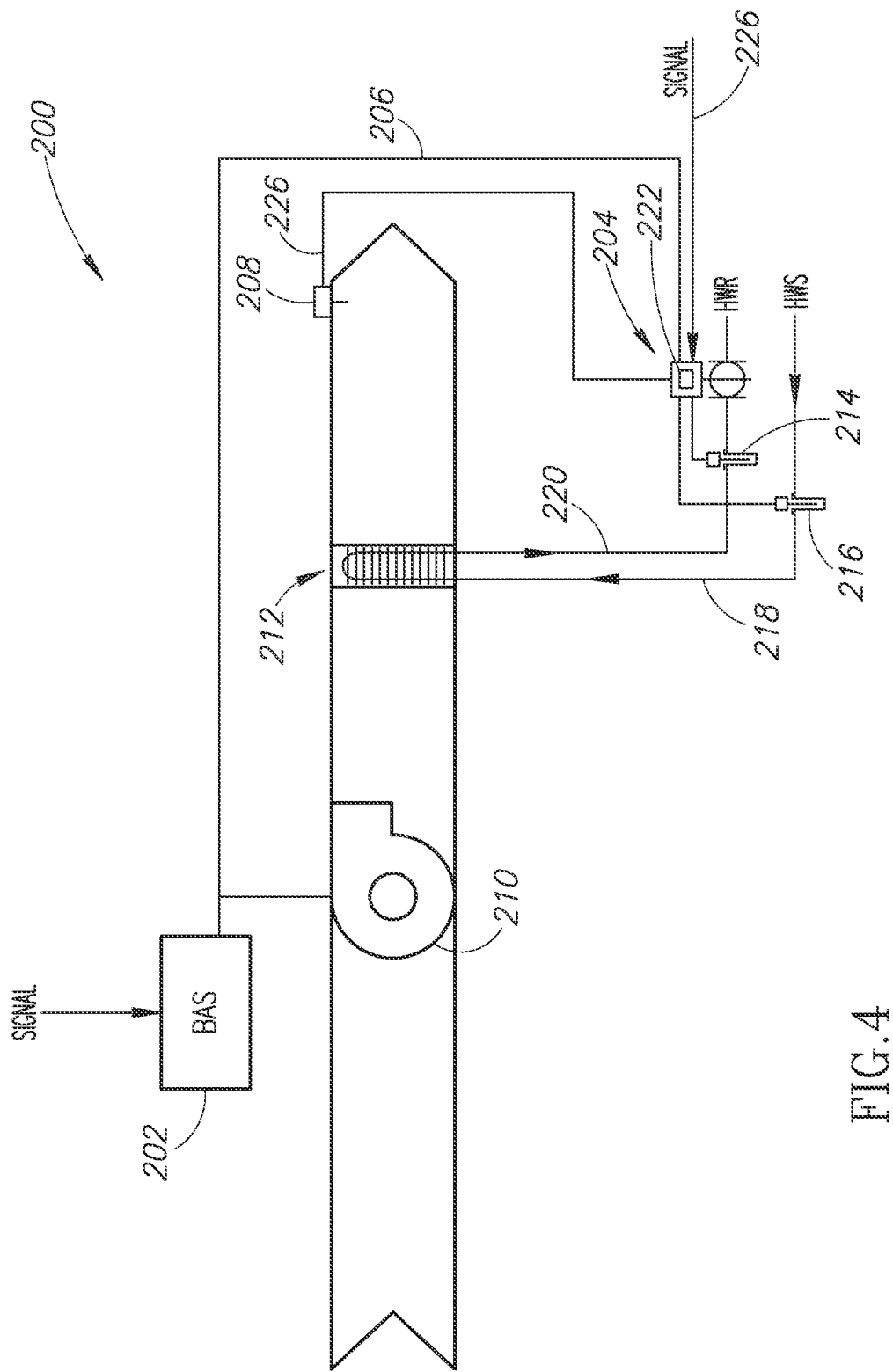
FIG. 4 is a schematic system drawing of an AHU with a building automation system that provides a temperature setpoint signal or value to a smart valve and wherein the smart valve information from an air temperature sensor and at least one water temperature sensor according to an embodiment of the present invention.

FIG. 4 shows a single coil AHU system 200 having a BAS 202 that strategically controls a smart valve 204 using an air temperature setpoint control signal 206 according to an embodiment of the present invention. The temperature setpoint control signal 206 may take the form of a desired temperature or temperature objective, for example the temperature setpoint signal 206 may be an air supply temperature desired to be achieved at an air temperature sensor 208 downstream of a fan 210 and a coil 212 or a temperature desired to be achieved in a room or space (not shown) that is being heated or cooled by the AHU system 200. The temperature setpoint signal 206, as compared to the position command signal 44 described above with respect to FIG. 1, allows the Operator to establish a temperature setpoint in the BAS 202 or for the setpoint to be automatically calculated based an certain conditions instead of programming the logic for a PI or PID loop control of the valve position.

In one embodiment, the air temperature setpoint 206 may be established using a fixed value set by the operator. Alternatively, the air temperature setpoint 206 may be automatically adjusted by the BAS 202 such that in cold weather it is higher and in warmer weather is set cooler by an algorithm based an the current, outside air temperature, an average of the outside temperatures over a predetermined amount of time, or some other function that employs the outside air temperature and/or a temperature of the space being conditioned by the AHU 200. The smart valve 204 also receives information from a water return (WR) temperature sensor 214 and may also receive information from a water supply (WS) temperature sensor 216. The WR and WS temperature sensors 214, 216 operate to provide water temperature values to the smart valve 204, and in turn the smart valve 204 determines a temperature differential between the supply and return lines 218, 220, respectively. A processor 222 in the smart valve 204 is programmable to process the air temperature information, the setpoint information, and the water temperature values independent of the BAS 202, and determine a valve position (e.g., percentage (%) open) of the smart valve 204.

Once the BAS 202 provides the temperature setpoint signal 206 to the smart valve 204, the processor 222 in the smart valve 204 will use that temperature setpoint signal 206 to adjust the valve position without additional input from the BAS 202 or at least until the BAS 202 determines that it is necessary to update the temperature setpoint signal 206. In another embodiment, a monitoring entity in networked communication with the BAS 202 may update the temperature setpoint signal 224 to the BAS 202 from a remote location. By way of example, the BAS system 202 may receive the updated temperature setpoint signal 224 pursuant to a desired communication protocol over an internet connection, a wireless connection or another type of data transfer communication platform. Alternatively, an updated temperature setpoint signal 226 may be transmitted directly to the smart valve 204 without use of the BAS 202.

Figure 5:
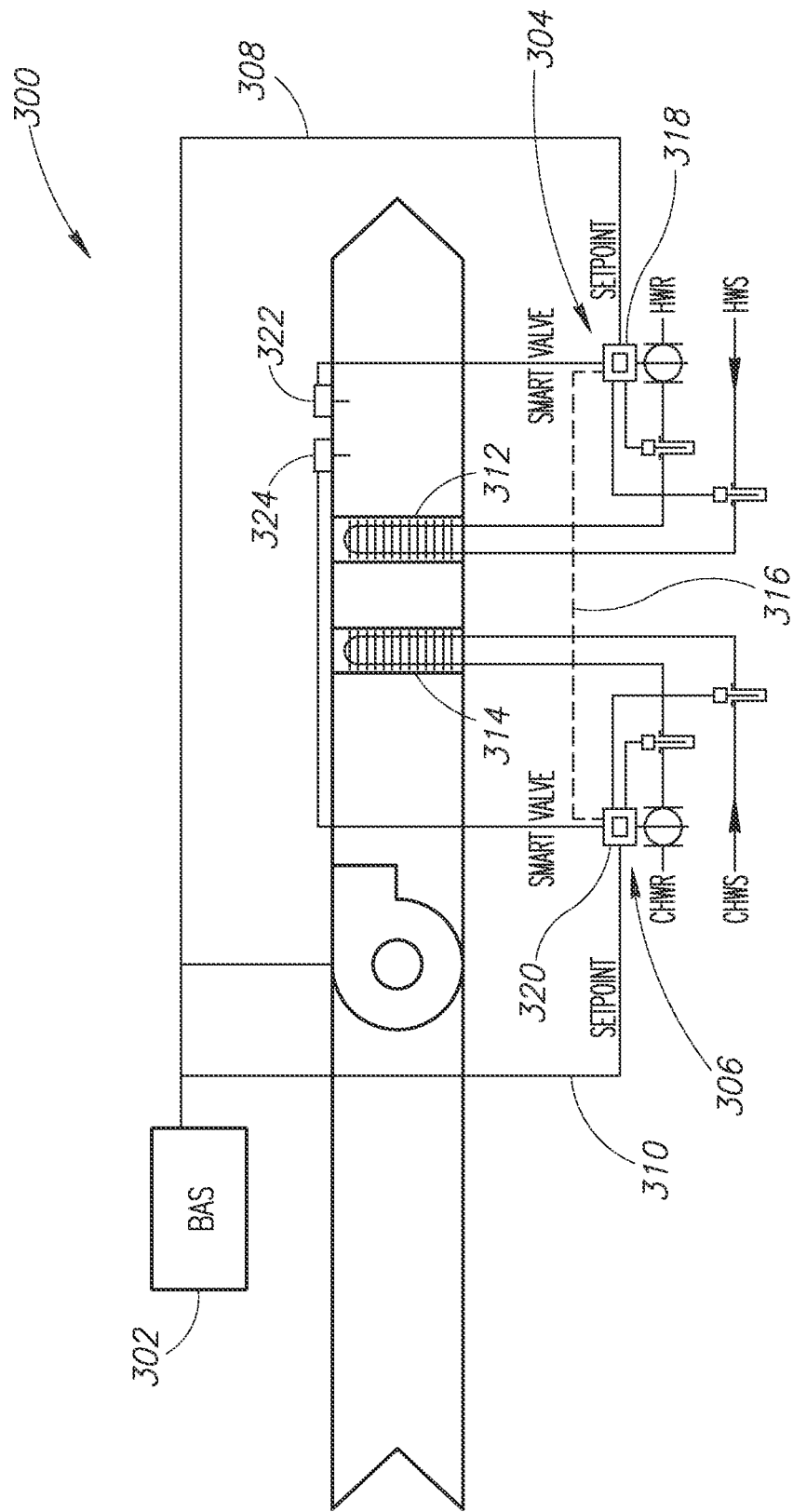
FIG. 5 is a schematic system drawing of an AHU with a building automation system that provides a temperature setpoint signal or value to at least two smart valves and wherein the smart valves process information from an air temperature sensors and water temperature sensors according to an embodiment of the present invention.

FIG. 5 shows a multi-coil AHU system 300 having a BAS 302 that strategically controls two or more smart valves 304, 306 using separate temperature setpoint control signals 308, 310 according to an embodiment of the present invention. Functionally, the multi-coil AHU system operates like the above-described embodiment of FIG. 4 except that smart valve 304 may control a heating coil 312 while the other smart valve 306 may control a cooling coil 314. As such, each smart valve 304, 306 may receive different temperature setpoint control signals 308, 310 at the same time or contemporaneously in time. In addition, a communication line 316 between the valves 304, 306 allows processors 318, 320 within the valves 304, 306 to cooperate together for heating, cooling, or maintaining the desired air temperature setpoint without applying simultaneous heating and cooling and without rapid changes from heating to cooling. In addition, the coordinated cooperation enables each smart valve 304, 306 to independently and continuously evaluate downstream air temperature as measured by two air temperature sensors 322, 324. In the illustrated embodiment, the air temperature sensor 322 is in direct, electronic communication with the smart valve 304 while the air temperature sensor 324 is in direct, electronic communication with the smart valve 306. The air temperature sensors can be placed in the airstream directly after their respective coils or both together in common airstream after both the coils 314,312, there are advantages inherent with either method of placement.

Figure 6:
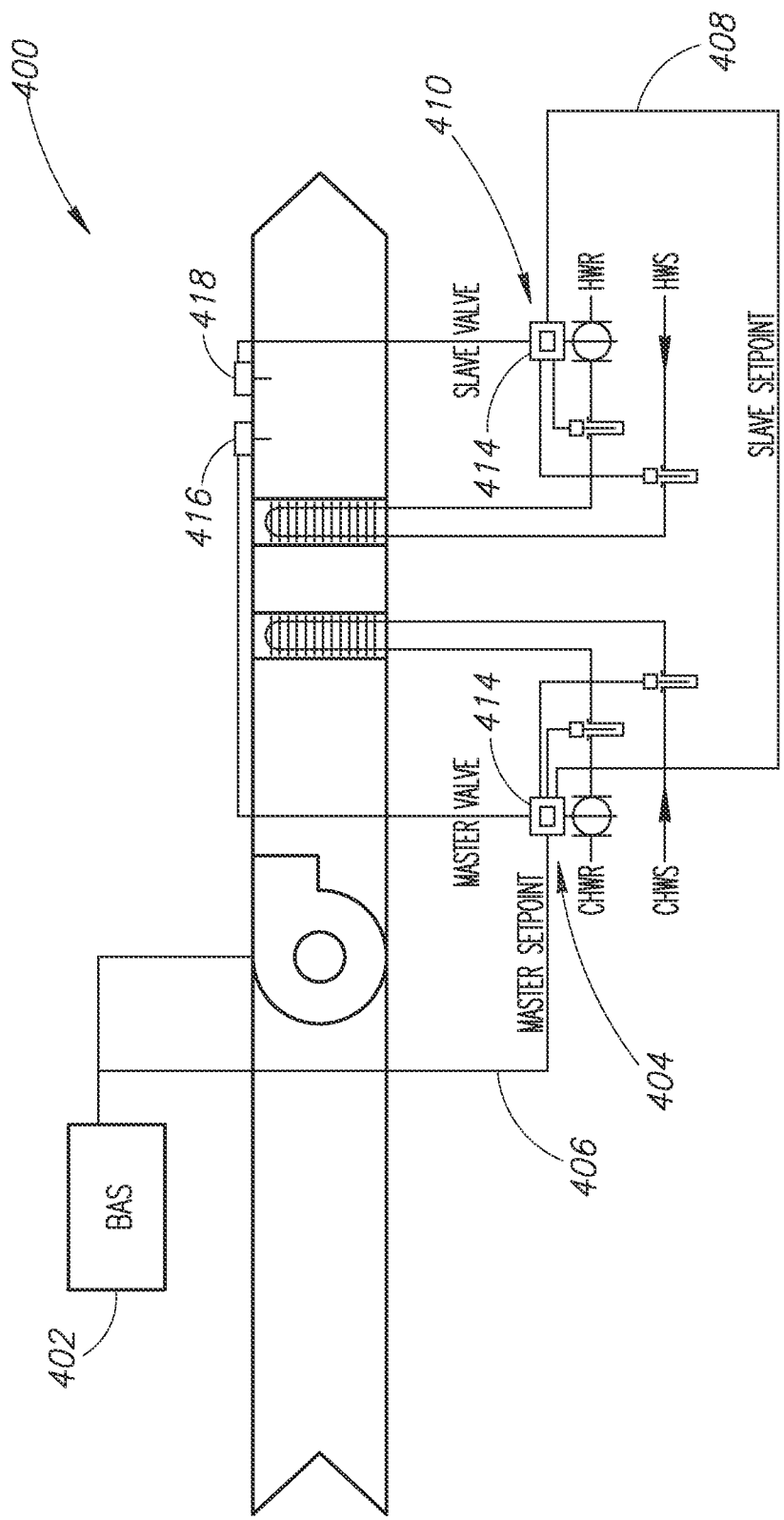
FIG. 6 is a schematic system drawing of an AHU with a building automation system that provides a temperature setpoint signal or value to at master smart valve that is programmed to control a second smart valve with a slave temperature setpoint signal or value according to an embodiment of the present invention.

FIG. 6 shows a multi-coil AHU system 400 for heating and cooling operations in which a BAS 402 communicates solely with a first smart valve 404 by transmitting a master temperature setpoint signal 406 thereto. The first smart valve 404, in turn, transmits a slave temperature setpoint signal 408 to a second smart valve 410. Thus, the AHU system 400 involves networking two smart valves 404, 410 together in a master/slave relationship. It is advantageous for the valves 404, 410 to know that they are both in the same AHU system 400, which may be accomplished by setting them up accordingly and denoting which controls heating and which controls cooling. The configuration of the illustrated AHU system 400 may advantageously save time and computing resources since the BAS 402 does not have to provide separate signals to the valves 404, 410, but instead only needs to provide one signal to the master valve 404. Processors 414 within the valves 404, 410 cooperate to ensure the proper heating or cooling is applied to maintain a desired air temperature setpoint without applying simultaneous heating and cooling and without rapid changes from heating to cooling. In addition, the coordinated cooperation enables each smart valve 404, 410 to independently and continuously evaluate downstream air temperatures as measured by two air temperature sensors 416, 418. In the illustrated embodiment, the air temperature sensors 416, 418 are in direct, electronic communication with the smart valves 404, 410, respectively. The air temperature sensors can be placed in the airstream directly after their respective coils or both together in common airstream after both the coils 314,312, there are advantages inherent with either method of placement.

Figure 7:
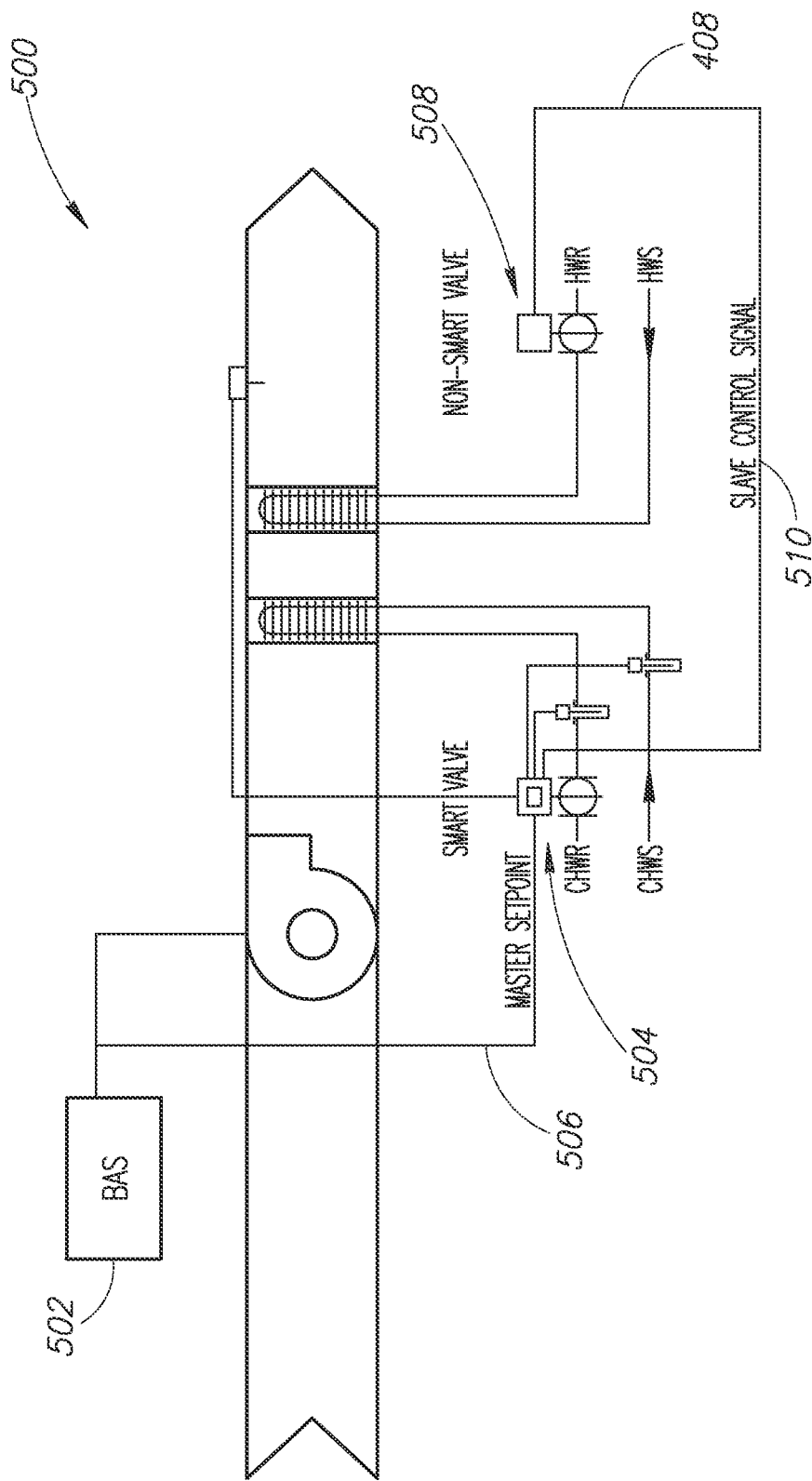
FIG. 7 is a schematic system drawing of an AHU with a building automation system that provides a temperature setpoint signal or value to at master smart valve that is programmed to control a second non-smart valve with a slave temperature setpoint signal or value or with a valve position signal or value according to an embodiment of the present invention.

FIG. 7 shows a multi-coil AHU system 500 for heating and cooling operations in which a BAS 502 communicates solely with a master smart valve 504 (master valve) by transmitting a master temperature setpoint signal 506 while the master valve 504 controls an operation of a non-smart valve 508, which in turn transmits a slave control signal 510 that may take the form of a command position signal. Utilizing a non-smart valve 508 in the AHU system 500 may reduce an overall cost of the AHU system 500 while simultaneously saving time and computing resources since the BAS 502 does not have to provide separate signals to the valves 504, 508, but instead may control only the master valve 504, which then controls the slave valve 508.

In operation, the multivariable control of the smart valve may include comparing a downstream air temperature with a setpoint value (e.g., setpoint air temperature) to modulate the smart valve, which may include, but is not limited to, setting a current position of the smart valve, controlling a temperature of the fluid leaving the coil, and controlling a temperature of the fluid entering the coil, when available. In the operation of various embodiments described herein, the temperature of the fluid leaving the coil at full capacity is programmed into the smart valve. When used, the temperature of the fluid entering the coil is also programmed into the smart valve. Further, the temperature of the air leaving the coil at full capacity (also commonly referred to as a "design condition" is also programmed into the smart valve as part of the setup regiment. Using these realtime, and recently collected values and this pre-programmed data, the smart valve processor may accurately estimate what change in capacity of the coil will occur from a specific incremental change in valve position. In addition, the smart valve can estimate what change in supply air temperature will occur from such a specific incremental change in valve position. This information allows the smart valve logic to provide near-optimal and rapid valve positioning responses for changing downstream air temperatures that may deviate from the setpoint air temperature while eliminating any latency or lag from direct control by the BAS. Consequently, aspects of the embodiments of the present invention described herein, however combined, may substantially improve both the accuracy and stability of air temperature control for an AHU system.

One problem that may occur within an AHU system is that one of the air coils may not be meeting its original designed specifications for operation. At present, the determination of such a defect requires special instrumentation and monitoring equipment to locate the defect. Further, it takes a very hot day or a very cold day to realize that one of the air coils is not meeting its mechanical design performance because during such extreme weather situations the AHU system is running at full capacity and there is no longer excess capacity to "mask" the problem.

Some of the common causes for a defective air coil may be, but are not limited to, dirt, dust, and foreign matter; a buildup of hair on an air side of the coils in which the hair restricts airflow over coils or reduces the direct contact of the air with the coils, which in turn reduces the heat transfer. The dirt, dust, hair, etc. fouling up the air coil is commonly referred to as airside fouling. In addition, dirt, dust, hair, and other particulate buildup on a water side of the air coils restricts water flow through the coils or the direct contact of water with the coils, which again reduces heat transfer. The particulate buildup on the waterside is commonly referred to as waterside fouling.

Another cause for a defective coil may take the form of a damaged coil, in which the mechanical or structural design integrity has been compromised in such a way that the rate of heat transfer is reduced. A closed isolation valve or a restriction in the water supply or return pipe may cause the coil to operate at a capacity below its mechanical designed operation. Lastly, a lack of flow or pressure of the fluid distributed through the system may reduce the water flow rate for the coil, which in turn would cause the coil to operate below its mechanical designed operation.

Another problem may occur when the AHU system is operating and the outside air temperature is at or below freezing. The introduction of freezing outside air directly to a coil may occur if a damper or preheating coil fails. This could lead to the freezing of the water inside the coil(s) and ultimately result in mechanical damage to the coil itself rendering it susceptible to leaks, poor performance and/or replacement.

Additional problems may occur when equipment fails within the AHU system such as fan or fan drive belt. Additionally or alternatively, the AHU system may be turned off, but the temperature control systems keep running, with the valve control trying to maintain a supply air temperature without airflow through the AHU system or over the coil. These conditions may result in a large waste of energy and can cause difficulties in adjacent or related systems.

Figure 8:
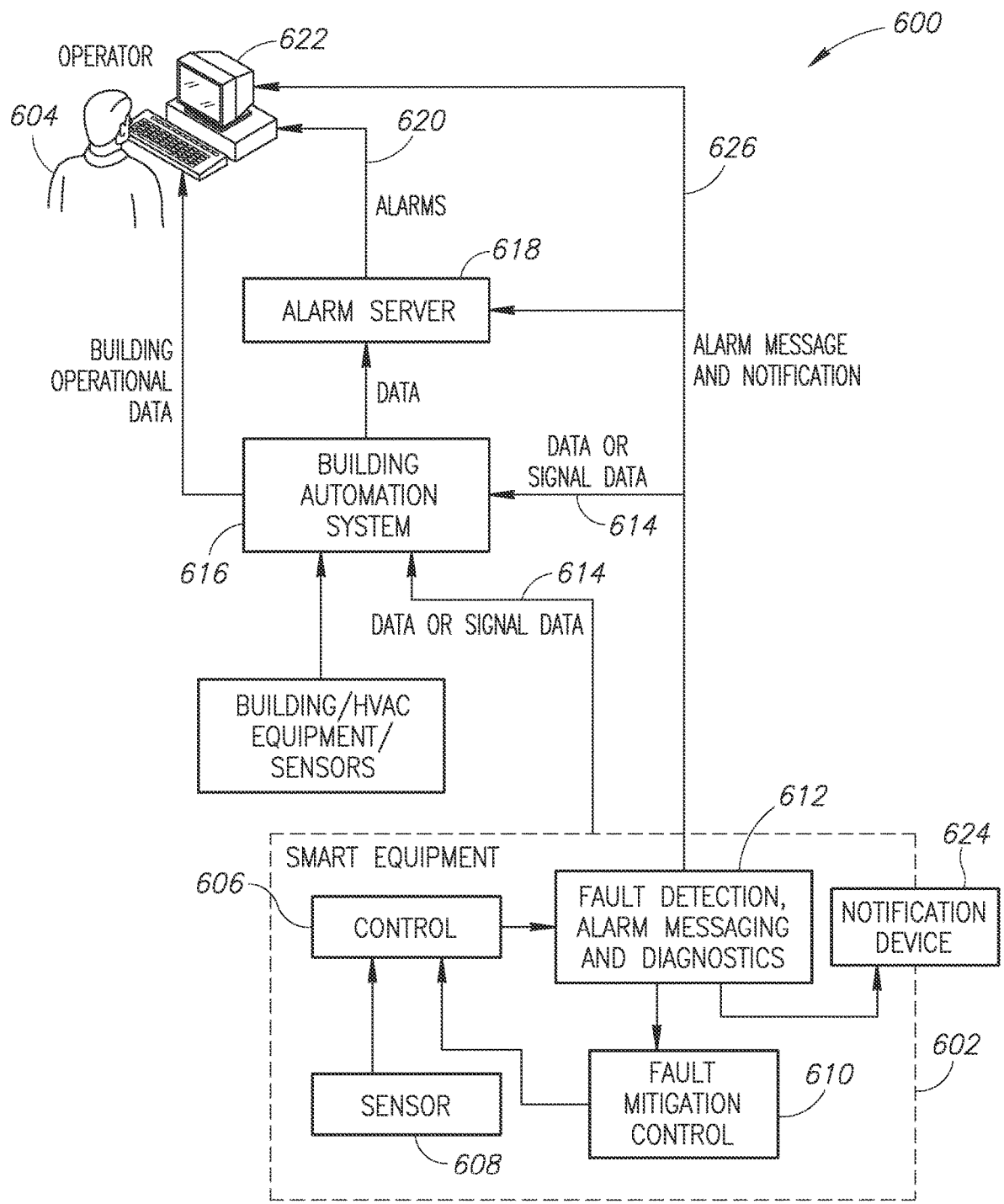
FIG. 8 shows a diagram of a fault detection system according to an embodiment of the present invention.

FIG. 8 shows a fault detection system 600 according to an embodiment of the present invention. In one embodiment, system 600 utilizes smart equipment 602 to automatically detect, correct and notify an Operator 604 of a problem that may be affecting the operating efficiency of one or more of the coils. The smart equipment 602 may take the form of a smart valve, a smart actuator, or some other component configured with a main control 606 that receives information from a plurality of sensors 608 and from a fault mitigation controller 610. The main control 606 communicates with a fault detection, alarm messaging, and diagnostics (FDAMD) system 612.

In the illustrated embodiment, issues or problems may be detected by the smart equipment 602 to determine whether an air coil has been compromised. Once identified, the smart equipment 602 provides data 614, which may take the form of a signal, to a building automation system (BAS) 616. The data 614 is then transmitted to an alarm server 618, which is configured to send an appropriate alarm signal 620 to a computing system 622 monitored by the operator 604. In addition, the FDAMD system 612 may send a message or signal 626, which may take the form of, but is not limited to, a colored or blinking light that provides a visual or audible indication to a repair person.

Referring to the illustrated embodiment and FIGS. 3-7, the smart equipment 602 (i.e., smart valve) receives data from a process liquid supply temperature sensor in the process liquid supply line and data from a process liquid return temperature sensor in the process return line and data from a supply air temperature sensor in the air supply downstream of the coil. The smart valve determines the entering temperature of the process liquid (to the coil), and the leaving temperature of the process liquid (from the coil). With the addition of the third measured temperature of the air supply temperature the smart valve may determine whether a variety of capacity-reducing or efficiency-reducing issues are present.

If the entering temperature and leaving temperature of the liquid remain very close in temperature (adjustable differential amount, normally set to less than one degree Fahrenheit), with no change in the supply air temperature for an adjustable period of time (e.g., ten minutes) while the position command to the valve is greater than zero percent open, then the AHU may be experiencing a lack of air flow. Based an this diagnosis, it is possible that one of two things has occurred (1): a fan of the AHU is not operating due to a mechanical failure (e.g., motor or fan belt); or (2) the BAS is disabled or off, but the position command to the valve remains at one hundred percent open.

The smart valve will detect the aforementioned situation and send a message or notification 626 from the FDAMD system 612 to the Operator 604 and also communicate with the notification device 624. Upon the aforementioned diagnosis, the smart valve will fully dose to mitigate any energy loss and remain in that state until the situation has been rectified and acknowledged. Once this has occurred, the smart valve may return to normal operation. The "fault detection" happens at the location of the smart valve, which eliminates the need for a higher level fault detection and diagnoses system to mitigate the situation at the source.

It is also possible for the smart valve to relay the situation through a network or directly to the BAS 616. Upon receiving the lack of air flow' signal, the BAS will shut down the fan until the situation can be rectified.

If the entering liquid temperature is known, the leaving liquid temperature is known, and the design parameters of the coil are known, then the smart valve may use the actual percentage open/closed position to determine an expected supply air temperature downstream from the coil. Further, the smart valve may also determine if the coil is operating within its design parameters. If it is determined that the coil is operating with reduced capacity then one of the following situations may be happening: (1) particulate buildup on the air side of the coil (airside fouling); (2) particulate buildup on the waterside of the coil (waterside fouling); (3) a mechanically damaged coil; (4) a conduit restriction that reduces the required amount of water flow for the coil; or (5) lack of flow or pressure.

Again, the smart valve may detect this situation and send a message to the operator and to the notification device. In one embodiment, the smart valve applies a rescaling/repositioning algorithm to mitigate any present energy loss until the message has been acknowledged and/or the situation has been rectified.

The smart valve may also determine whether the air flowing over the coil is approaching a freezing temperature, which may indicate the coil is in danger of being damaged by water that freezes within the coil. It is also possible to determine this if any one of the water temperature sensors or the air temperature sensor measures a temperature dose to freezing for a period of time.

The smart valve will detect this situation and communicate the potential problem to the operator and the notification device. The smart valve will fully open (100% valve position), to mitigate the possibility of the water freezing inside the coil by increasing the flow rate of the water.

In this embodiment, the smart valve provides fault detection for the coil it directly controls in accordance with the descriptions herein. It also provides certain fault detection for the coil downstream whose fluid flow is modulated by a slave non-smart valve. The AHU system includes smart valve control logic combined with at least one air temperature sensor directly connected, electronically, to the smart valve while the second valve is a non-smart valve. The air temperature sensor is located downstream from the second coil to which the non-smart valve is connected. Data obtained from the air temperature sensor may permit early detection of potential problems in the AHU system, provide a more responsive control time to potential problems in the AHU system, and may enable the AHU system to operate for an interim amount of time under specifically controlled conditions when one or more components in the AHU system has been identified as having potential damage. Potential problems may take a variety of forms, but may be generally classified as mechanical, control-related, electrical, and environmental or some combination thereof.

While the preferred embodiment of the invention has been illustrated and described, as noted above, many changes can be made without departing from the Spirit and scope of the invention. In addition, other advantages will also be apparent to those of skill in the ad with respect to any of the above-described embodiments whether viewed individually or in some combination thereof. Accordingly, the scope of the invention is not limited by the disclosure of the preferred embodiment. Instead, the invention should be determined entirely by reference to the Claims that follow.

What is claimed is:

1. A fault detection system for detecting a flow restriction in an air handler unit, the fault detection system comprising:
   a coil located in an air duct of the air handler unit, the coil configured to operate as a conduit for process fluid in the air duct;
   air temperature sensors located in an air duct of the air handler unit, one temperature sensor located to determine an air temperature of air present in the air duct upstream of the coil and another temperature sensor located to determine an air temperature of air present in the air duct downstream of the coil;
   liquid temperature sensors located to determine a liquid temperature entering the coil and to determine a liquid temperature exiting the coil;
   a smart valve having a controller in communication with the liquid temperature sensors and at least one of the air temperature sensors, the controller operable to use the air temperature downstream of the coil and a valve actuator position to determine whether the coil is operating at a reduced capacity; and
   a notification device in communication with the controller of the smart valve.

2. The fault detection system of claim 1, wherein the controller is configured to modulate the valve actuator position to minimize an energy loss of the air handler unit until rectification of the reduced capacity.

3. The fault detection system of claim 1, wherein the controller is configured to modulate the valve actuator position to produce an overflow of liquid supplied to the coil.

4. The fault detection system of claim 3, wherein the overflow of liquid supplied to the coil mitigates a performance loss of the air handler unit for a designated period of time.

5. The fault detection system of claim 4, wherein the designated period of time is an amount of time for the rectification of the reduced capacity.

6. The fault detection system of claim 1, wherein the controller of the smart valve is configured, upon determining the reduced capacity, to send a message to the notification device.

7. A fault detection system for detecting a flow restriction in an air handler unit, the fault detection system comprising:
   a coil located in an air duct of the air handler unit, the coil configured to operate as a conduit for process fluid in the air duct;
   an air temperature sensor located in an air duct of the air handler unit to determine an air temperature downstream of the coil; and
   a smart valve having a controller in communication with the air temperature sensor, the controller operable to use the air temperature downstream of the coil and a valve actuator position to determine whether the coil is operating at a reduced capacity, and to modulate the valve actuator position to minimize an energy loss of the air handler unit until rectification of the reduced capacity.

8. A fault detection system for detecting a flow restriction in an air handler unit, the fault detection system comprising:
   a coil located in an air duct of the air handler unit, the coil configured to operate as a conduit for process fluid in the air duct;
   an air temperature sensor located in an air duct of the air handler unit to determine an air temperature downstream of the coil;
   a smart valve having a controller in communication with the air temperature sensor, the controller operable to use the air temperature downstream of the coil and a valve actuator position to determine whether the coil is operating at a reduced capacity; and
   a notification device in communication with the controller of the smart valve, whereby upon determining the reduced capacity, the controller of the smart valve sends a message to the notification device.

* * * * *